(12) United States Patent
Suzuki et al.

(10) Patent No.: US 11,543,485 B2
(45) Date of Patent: Jan. 3, 2023

(54) DETERMINING LOCATION OR ORIENTATION BASED ON ENVIRONMENT INFORMATION

(71) Applicant: Samsung Electronics Co., Ltd., Suwon-si (KR)

(72) Inventors: Masaki Suzuki, Sunnyvale, CA (US); Sergio Perdices-Gonzalez, Sunnyvale, CA (US); Pranav Mistry, Saratoga, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1059 days.

(21) Appl. No.: 16/208,493

(22) Filed: Dec. 3, 2018

(65) Prior Publication Data

US 2019/0360811 A1 Nov. 28, 2019

Related U.S. Application Data

(60) Provisional application No. 62/575,082, filed on May 22, 2018.

(51) Int. Cl.
*G01S 3/786* (2006.01)
*G01S 19/49* (2010.01)

(52) U.S. Cl.
CPC ............ *G01S 3/7861* (2013.01); *G01S 19/49* (2013.01)

(58) Field of Classification Search
CPC .... G01S 3/7861; G01S 3/7864; G01S 3/7865; G01S 3/7867; G01C 21/025
See application file for complete search history.

(56) References Cited

U.S. PATENT DOCUMENTS

| | | | |
|---|---|---|---|
| 5,546,310 A | 8/1996 | Ehdaie et al. | |
| 7,526,381 B2 | 4/2009 | Twitchell, Jr. | |
| 7,805,244 B2 | 9/2010 | Park et al. | |
| 8,390,696 B2 | 3/2013 | Komoto et al. | |
| 2010/0283840 A1* | 11/2010 | Belenkii | G01C 21/02 356/8 |
| 2012/0021385 A1* | 1/2012 | Belenkii | G09B 27/00 434/19 |
| 2012/0173143 A1* | 7/2012 | Belenkii | G01C 21/02 348/36 |

(Continued)

FOREIGN PATENT DOCUMENTS

| | | |
|---|---|---|
| CN | 102255991 A | 11/2011 |
| CN | 103292776 B | 6/2016 |

(Continued)

*Primary Examiner* — Luke D Ratcliffe

(57) ABSTRACT

A system and method include generating environment data from skylight sensor data. The environment data includes a value of a geospatially dependent parameter associated with light received from a predetermined celestial light source. At least two of a compass direction of the predetermined celestial light source when the skylight sensor data was received, a time at which the skylight sensor data was received, or a geospatial coordinate at which the skylight sensor data was collected are received. At least one of the compass direction of the predetermined celestial light source when the skylight sensor data was received, the time at which the skylight sensor data was received, or the geospatial coordinate at which the skylight sensor data was collected is determined, at least in part, from the environment data.

20 Claims, 16 Drawing Sheets

(56) References Cited

U.S. PATENT DOCUMENTS

2019/0056512 A1* 2/2019 Onomura .............. G01C 21/165
2019/0331762 A1* 10/2019 Aycock .................. G06V 20/20

FOREIGN PATENT DOCUMENTS

CN 107270888 A 10/2017
CN 107689064 A * 2/2018 ............... G06T 7/75
JP 5572053 B2 8/2014

* cited by examiner

DETERMINING LOCATION OR ORIENTATION BASED ON ENVIRONMENT INFORMATION

CROSS- REFERENCE TO RELATED APPLICATION

The present application claims the benefit of U.S. Provisional Patent Application Ser. No. 62/675,082, filed May 22, 2018, which is incorporated herein by reference in its entirety for all purposes.

TECHNICAL FIELD

The present disclosure relates in general to computing devices and in particular to a system and method for determining location or orientation based on environment information.

BACKGROUND

Recently, with the development of mobile technologies such as the Internet of Things (IoT), self-driving cars, and the like, there has been increased interest in positioning technology. For example, advancing the reliability of various positioning technologies will advantageously improve automatic/autonomous driving technologies.

One widely used positioning technology is based on the Global Positioning System (GPS). However, GPS-based technologies are subject to significant disadvantages. For example, a typical GPS receiver may require continuous tracking and/or information processing for accuracy, which requires computation power and can quickly drain batteries. Also, a GPS receiver can sometimes lose its satellite signal, which requires time for signal re-acquisition and relock, if re-acquisition and relock are even possible. Moreover, the current GPS technology generally cannot provide compass data without movement. Finally, GPS components are relatively expensive, relative to other components in an integrated device or system, such as a smartphone.

SUMMARY

Among other things, embodiments of the present disclosure enable a determination or calculation of one of four variables, including the position on the earth, position of the sun, current local time, and device orientation, when the other three variables are known. These embodiments also include apparatus and methods for measuring or acquiring at least three of these variables such that the fourth variable can be calculated or determined.

Exemplary embodiments of the present disclosure include a system and method, which generate environment data from skylight sensor data. The environment data includes a value of a geospatially dependent parameter associated with light received from a predetermined celestial light source. At least two of a compass direction of the predetermined celestial light source when the skylight sensor data was received, a time at which the skylight sensor data was received, or a geospatial coordinate at which the skylight sensor data was collected are received. At least one of the compass direction of the predetermined celestial light source when the skylight sensor data was received, the time at which the skylight sensor data was received, or the geospatial coordinate at which the skylight sensor data was collected is determined, at least in part, from the environment data.

One advantage of position devices according to embodiments of the present disclosure is that they can determine positioning without the need to work in cooperation with external devices, such as GPS satellites. (Although such embodiments can also work in cooperation with other positioning devices, such as GPS satellites.) Furthermore, these positioning systems can be used as an auxiliary positioning system when GPS signals are not received/acquired. Generally, particular embodiments of the present disclosure can provide for a wide range of possibilities including, but not limited to: (1) location without GPS; (2) orientation without GPS; (3) a fast lock-in positional system; (4) GPS assisted tracking; (5) a GPS assisted compass; and (6) time estimation from current known position.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," "may include," "can have," or "can include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the computing device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic accessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to embodiments of the present disclosure, the computing device can be a smart home appliance. Examples of the smart home appliance can include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™ APPLE TV™, or GOOGLE TV™) , a gaming console (XBOX™, PLAYSTATION™), an electronic dictionary, an electronic key, a camcorder, or an electronic picture frame.

According to certain embodiments of the present disclosure, examples of the computing device can include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing computing device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, the computing device can be at least one of a part of a piece of furniture or building/structure, an electronic board, an electronic signature receiving device, a projector, or various measurement devices (e.g., devices for measuring water, electricity, gas, or electromagnetic waves).

According to embodiments of the present disclosure, the computing device is one or a combination of the above-listed devices. According to embodiments of the present disclosure, the computing device is a flexible computing device. The computing device disclosed herein is not limited to the above-listed devices, and can include new computing devices depending on the development of technology.

As used herein, the term "user" may denote a human or another device (e.g., an artificial intelligent computing device) using the computing device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF DRAWINGS

For a more complete understanding of this disclosure, and the advantages thereof, reference is now made to the following descriptions taken in conjunction with the accompanying drawings, in which.

DETAILED DESCRIPTION

FIGS. 1 through 9, discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged wireless communication system.

Figure 1:
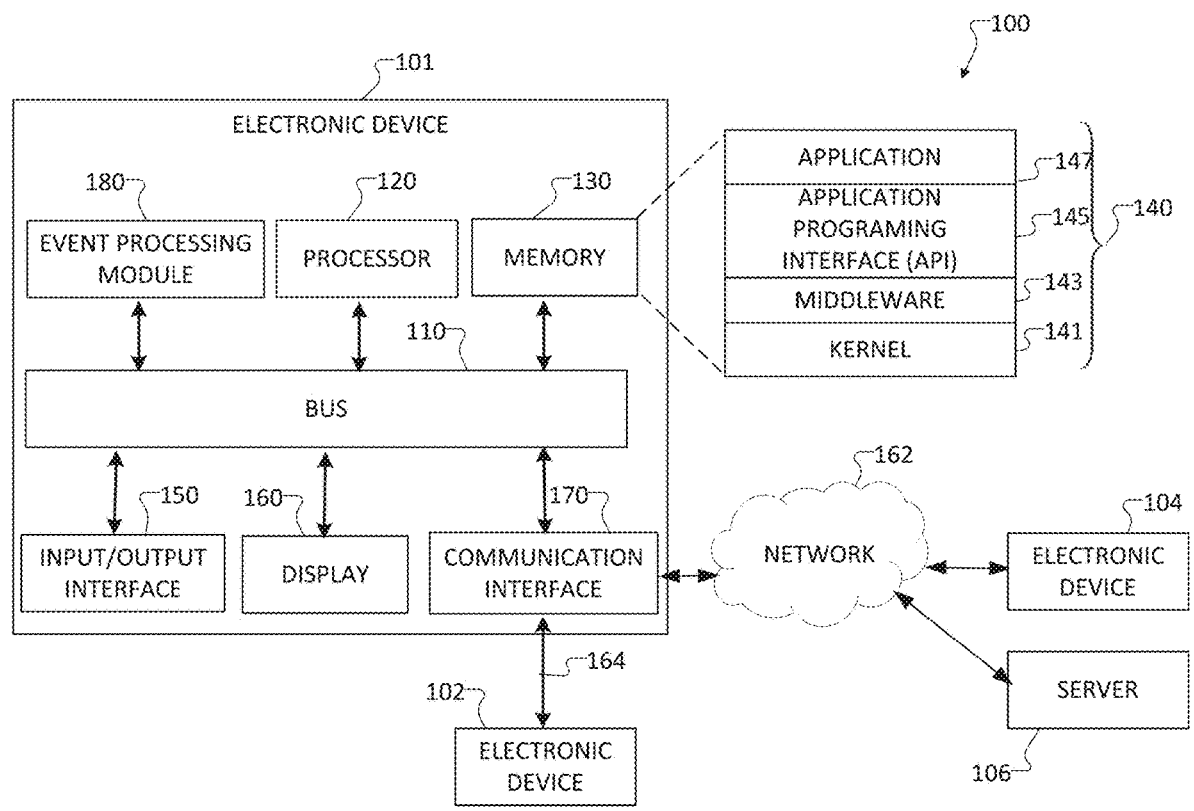
FIG. 1 is a block diagram showing selected components of an electronic computing and communications system including a computing device according to embodiments of the present disclosure.

FIG. 1 illustrates an example network environment 100 according to various embodiments of the present disclosure. The embodiment of the network environment 100 shown in FIG. 1 is for illustration only. Other embodiments of the network environment 100 could be used without departing from the scope of this disclosure.

Referring to FIG. 1, according to an embodiment of the present disclosure, a computing device 101 is included in a network environment 100. The computing device 101 may include at least one of a bus 110, a processor 120, a memory 130, an input/output interface 150, a display 160, a communication interface 170, or an event processing module 180. In some embodiments, the computing device 101 may exclude at least one of the components or may add another component.

For example, examples of the computing device 110 according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

According to an embodiment of the present disclosure, the computing device 110 may be a smart home appliance. Examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™) , a gaming console (Xbox™, PlayStation™), an electronic dictionary, an electronic key, a camcorder, or an electronic picture frame.

According to an embodiment of the present disclosure, examples of the computing device 110 may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing computing device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the computing device 110 may at least one of part of a piece of furniture or building/structure, an electronic board, an electronic signature receiving device, a projector, or various measurement devices (e.g., devices for measuring water, electricity, gas, or electromagnetic waves).

According to an embodiment of the present disclosure, the computing device 110 may be one or a combination of the above-listed devices. According to an embodiment of the present disclosure, the computing device may be a flexible computing device. The computing device disclosed herein is not limited to the above-listed devices, and may include new computing devices depending on the development of technology.

As used herein, the term "user" may denote a human or another device (e.g., an artificial intelligent computing device) using the computing device 110.

Returning to FIG. 1, the bus 110 may include a circuit for connecting the components 120 to 180 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the computing device 101, and/or perform an operation or data processing relating to communication.

The memory 130 may include a volatile and/or non-volatile memory. For example, the memory 130 may store commands or data related to at least one other component of the computing device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the computing device 101 to control or manage the system resources.

The middleware 143 may function as a relay to allow the API 145 or the application 147 to communicate data with the kernel 141, for example. A plurality of applications 147 may be provided. The middleware 143 may control work requests received from the applications 147, e.g., by allocation the priority of using the system resources of the computing device 101 (e.g., the bus 110, the processor 120, or the memory 130) to at least one of the plurality of applications 134.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the computing device 101. Further, the input/output interface 150 may output commands or data received from other component(s) of the computing device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the computing device 101 and an external computing device (e.g., a first computing device 102, a second computing device 104, or a server 106). For example, the communication interface 170 may be connected with the network 162 or 164 through wireless or wired communication to communicate with the external computing device.

The first external computing device 102 or the second external computing device 104 may be a wearable device or a computing device 101-mountable wearable device (e.g., a head mounted display (HMD)). When the computing device 101 is mounted in an HMD (e.g., the computing device 102), the computing device 101 may detect the mounting in the HMD and operate in a virtual reality mode. When the computing device 101 is mounted in the computing device 102 (e.g., the HMD), the computing device 101 may communicate with the computing device 102 through the communication interface 170. The computing device 101 may be directly connected with the computing device 102 to communicate with the computing device 102 without involving with a separate network.

The wireless communication may use at least one of, e.g., long term evolution (LTE), long term evolution- advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of universal serial bus (USB), high definition multimedia interface (HDMI), recommended standard 232 (RS-232), or plain old telephone service (POTS).

The network 162 may include at least one of communication networks, e.g., a computer network (e.g., local area network (LAN) or wide area network (WAN)), Internet, or a telephone network.

The first and second external computing devices 102 and 104 each may be a device of the same or a different type from the computing device 101. According to an embodiment of the present disclosure, the server 106 may include a group of one or more servers. According to an embodiment of the present disclosure, all or some of operations executed on the computing device 101 may be executed on another or multiple other computing devices (e.g., the computing devices 102 and 104 or server 106). According to an embodiment of the present disclosure, when the computing device 101 should perform some function or service automatically or at a request, the computing device 101, instead of executing the function or service on its own or additionally, may request another device (e.g., computing devices 102 and 104 or server 106) to perform at least some functions associated therewith. The other computing device (e.g., computing devices 102 and 104 or server 106) may execute the requested functions or additional functions and transfer a result of the execution to the computing device 101. The computing device 101 may provide a requested function or service by processing the received result as it is or additionally. To that end, a cloud computing, distributed computing, or client-server computing technique may be used, for example.

Although FIG. 1 shows that the computing device 101 includes the communication interface 170 to communicate with the external computing device 104 or 106 via the network 162, the computing device 101 may be independently operated without a separate communication function, according to an embodiment of the present disclosure.

The server 106 may support to drive the computing device 101 by performing at least one of operations (or functions) implemented on the computing device 101. For example, the server 106 may include an event processing server module (not shown) that may support the event processing module 180 implemented in the computing device 101.

For example, the event processing server module may include at least one of the components of the event processing module 180 and perform (or instead perform) at least one of the operations (or functions) conducted by the event processing module 180.

The event processing module 180 may process at least part of information obtained from other elements (e.g., the processor 120, the memory 130, the input/output interface 150, or the communication interface 170) and may provide the same to the user in various manners. For example, according to an embodiment of the present disclosure, the event processing module 180 may process information related to an event, which is generated while the computing device 101 is mounted in a wearable device (e.g., the computing device 102) to function as a display apparatus and to operate in the virtual reality mode, to fit the virtual reality mode and display the processed information. When the event generated while operating in the virtual reality mode is an event related to running an application, the event processing module 180 may block the running of the application or process the application to operate as a background application or process.

Although in FIG. 1 the event processing module 180 is shown to be a module separate from the processor 120, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of the present disclosure in interoperation with at least one program 140 stored in the memory 130.

Exemplary embodiments described herein are not meant to be limiting and merely illustrative of various aspects of the disclosure. While exemplary embodiments may be indicated as applicable to a particular device category (e.g., TVs, etc.) the processes and examples provided are not intended to be solely limited to the device category and can be broadly applicable to various device categories (e.g., appliances, computers, automobiles, etc.)

Figure 2A:
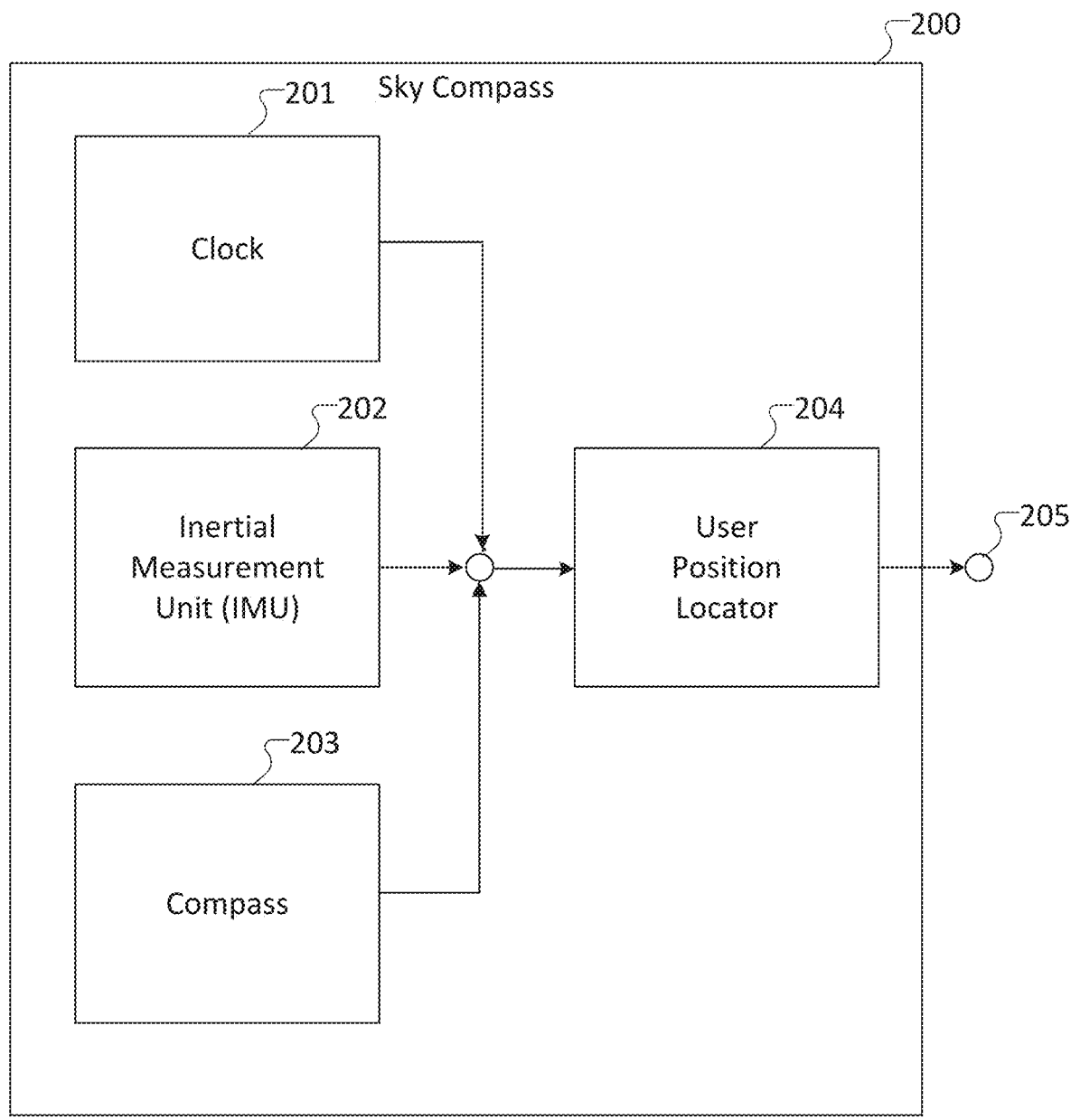
FIG. 2A is a block diagram showing a representative sky compass according to embodiments of the present disclosure.

FIG. 2A illustrates a sky compass 200 according to embodiments of the present disclosure. Sky compass 200 can be a stand-alone device or be embedded within another electronic or computing device, such as electronic device 101. For example, sky compass 200 may be embedded within a smartphone and operate cooperatively with smartphone resources such as cameras, processors, and memory.

In the embodiment of FIG. 2A, sky compass 200 includes an electronic clock 202, an inertial measurement unit (IMU) 202, electronic compass 203, and user position locator 204. These devices may be discrete or may be integrated, in whole or in part, into a single unit.

Figure 2B:
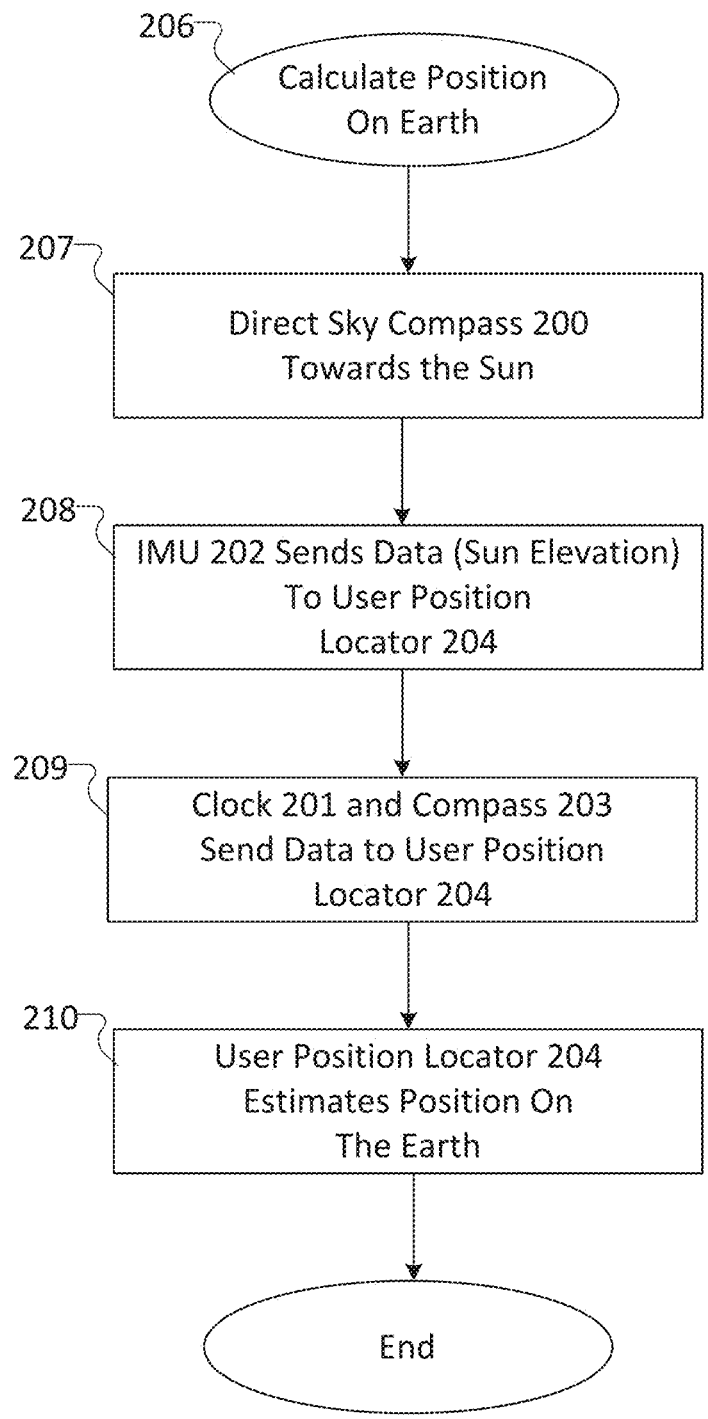
FIG. 2B is a flowchart of a representative procedure for calculating a position on earth using the sky compass of FIG. 2B.

The operation of sky compass 200 can be understood by reference to FIG. 2B, which is a flow chart of a procedure 206 for calculating the position on earth of sky compass 200. At Block 207, sky compass is pointed to an object in the sky, which could be the sun, a visible planet, or constellation or pattern of stars. For example, if sky compass 200 is embedded in a smartphone, the user might point the smartphone towards the sun during the day or towards a constellation, star, or planet at night.

IMU 202 sends position data (e.g., azimuth and elevation data) of the object (e.g., the sun) to user position locator 204 (Block 208). In addition, position locator 204 receives compass bearing and current time data from compass 203 and clock 201 (Block 209). From the measured position of the object in the sky, the compass bearing, and the current time, user position locator 204 determines the current position on the earth of sky compass 200 and provides the result at output 205 (Block 210).

In certain embodiments, sky compass 200 uses machine learning and training from acquired reference data ("ground truth data") for variables including sky object position, compass bearing, time, and position on earth. For example, reference data may be acquired for a first reference point, including acquired values for the position of a selected sky object (e.g., variable $W_1$), the compass bearing (e.g., variable $X_1$), current time (e.g., variable $Y_1$), and current position on earth (e.g., variable $Z_1$). Similarly, reference data are then acquired for a second reference point, including acquired values for another position of the selected sky object (e.g., variable $W_2$), the compass bearing (e.g., variable $X_1$) associated with the second reference point, current time (e.g., variable $Y_2$) associated with the second reference point, and current position on earth (e.g., variable $Z_2$) associated with the second reference point. This process is repeated until data are acquired for n number of reference points, including data for a further position of the sky object (e.g., variable $W_n$), the compass bearing (e.g., variable $X_n$) associated with the n-th reference point, current time (e.g., variable $Y_n$) associated with the n-th reference point, and current position on earth (e.g., variable $Z_n$) associated with the n-th reference point, with n being an integer. Once the reference data are obtained, sky compass 200 is trained to recognize patterns between the variables, which can then be used to determine the value for the fourth variable when the values of the three other variables are known. For example, in some embodiments, the machine learning process can be utilized to train one or more models. At least some embodiments of the present disclosure can utilize one or more trained models to recognize the relationship among the variables, such that the value of one variable can be calculated or estimated when the values of the other three variables are given, measured, determined, or otherwise acquired.

Figure 3A:
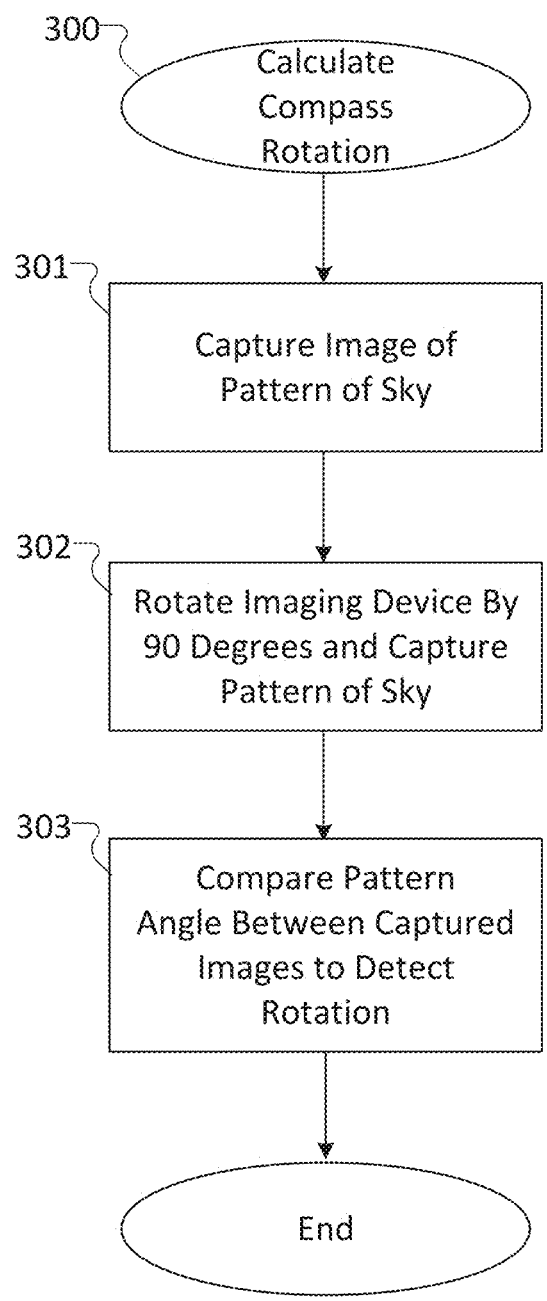
FIG. 3A is a flowchart of a process for calculating compass rotation according to embodiments of the present disclosure.
Figure 3B:
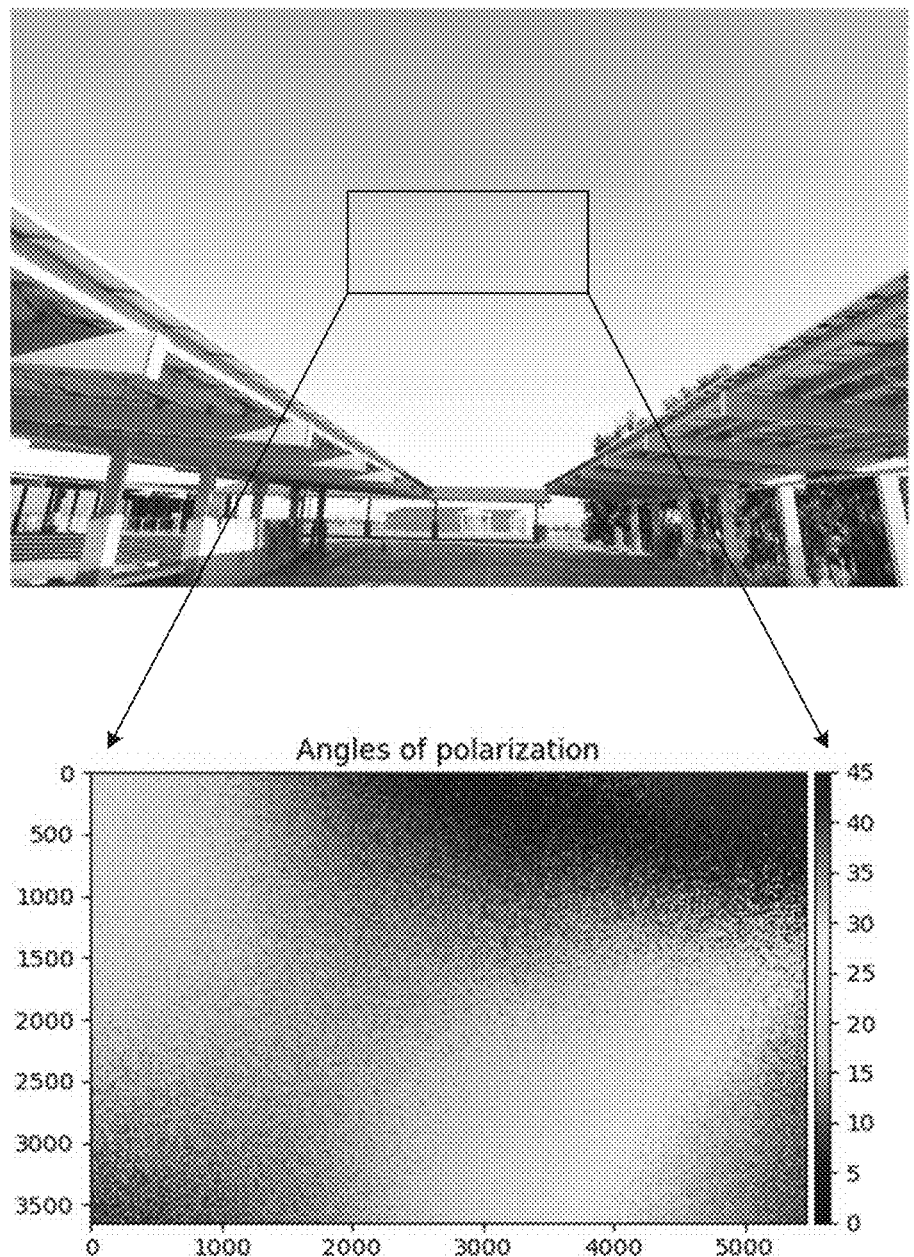
FIGS. 3B and 3C are diagrams of an example Rayleigh sky map data suitable for describing the details of the procedure shown in FIG. 3A.
Figure 3C:
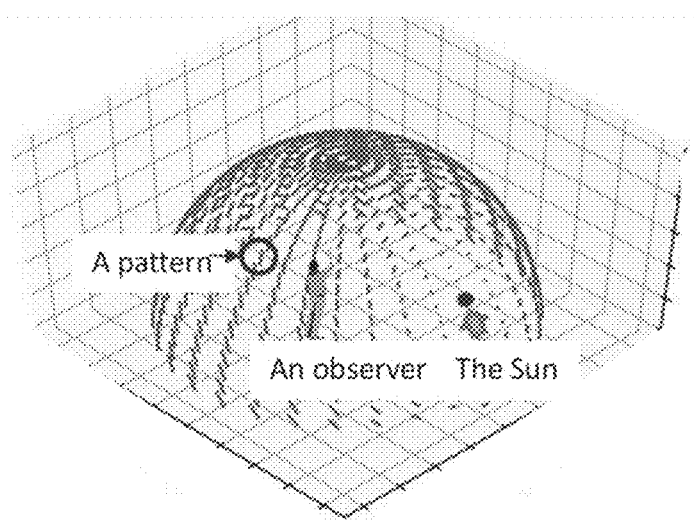

FIG. 3A is a flow chart of a procedure 300 for calculating compass rotation (e.g., device orientation) according to embodiments of the present disclosure. Procedure 300 takes advantage of a Rayleigh sky map, as shown in FIGS. 3B and 3C. In particular, a Rayleigh sky map indicates the angles of polarization across a band of wavelengths, and changes based on the angle of incidence with the sun and the position of the observer.

At Block 301 of procedure 300, an image ("sky pattern") is captured of a portion of the sky as exemplified in FIG. 3B. Exemplary devices for capturing sky patterns are discussed in detail below. The imaging device is rotated by ninety (90) degrees and another image is taken of substantially the same portion of the sky (Block 302). The pattern angle is then compared between the captured images to detect compass rotation.

Figure 4A:
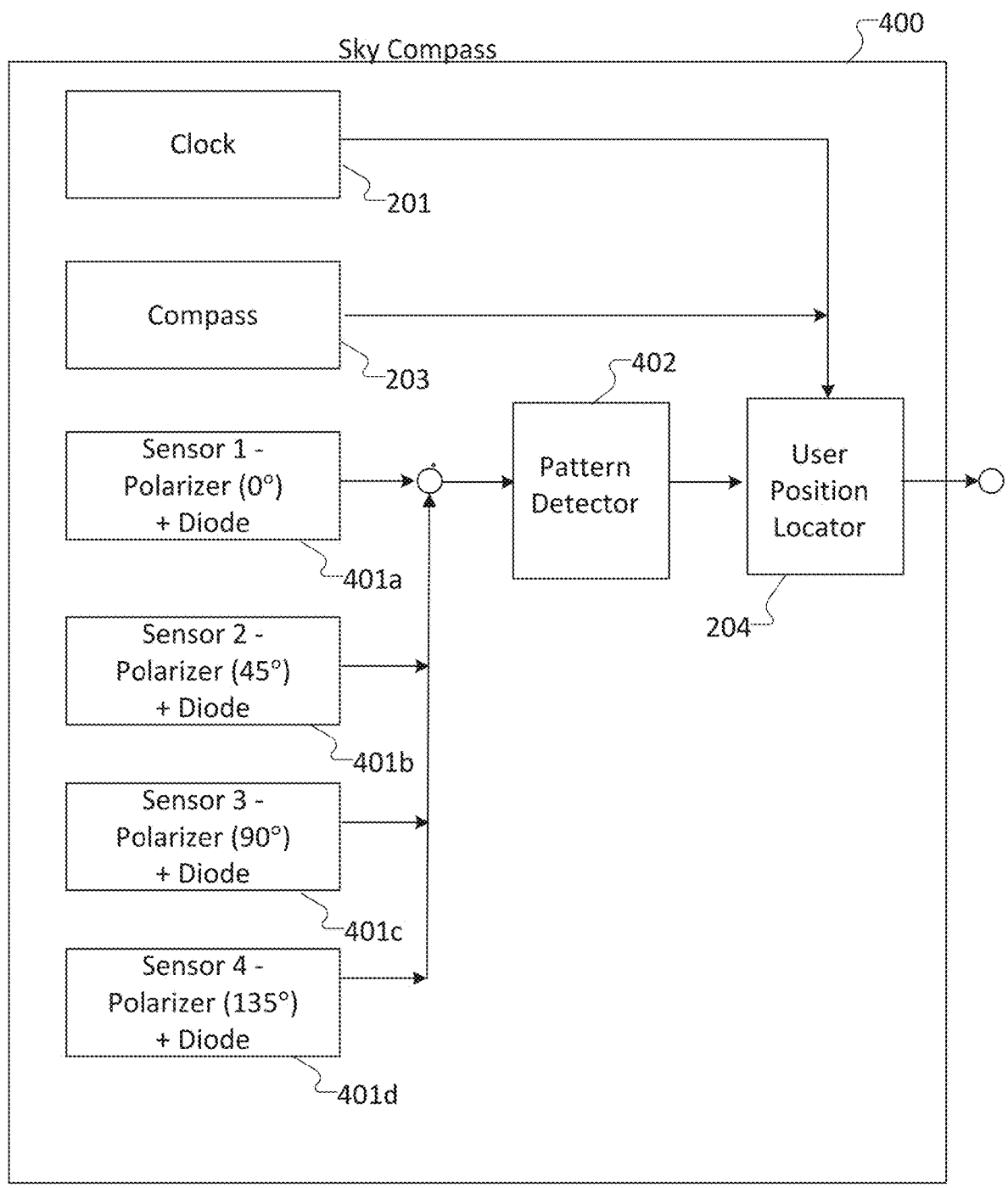
FIG. 4A is a block diagram illustrating another example of a sky compass according to embodiments of the present disclosure.

FIG. 4A illustrates an exemplary sky compass 400 according to another embodiment of the present principles. Similar to sky compass 200, sky compass 400 includes clock 201, compass 203, and user position locator 204. Sky compass 400 also includes a set of sensors 401 for capturing light at various polarization angles to generate a sky pattern. In the illustrated embodiment of sky compass 400, the set of sensors includes a sensor 401a with a 0 degree polarizer, a sensor 401b with 45 degree polarizer, a sensor 401c with a 90 degree polarizer and a sensor 401d with a 135 degree polarizer. (In alternate embodiments, the number of sensors 401 and/or the polarizer angles may vary, depending on the desired application.)

Figure 4B:
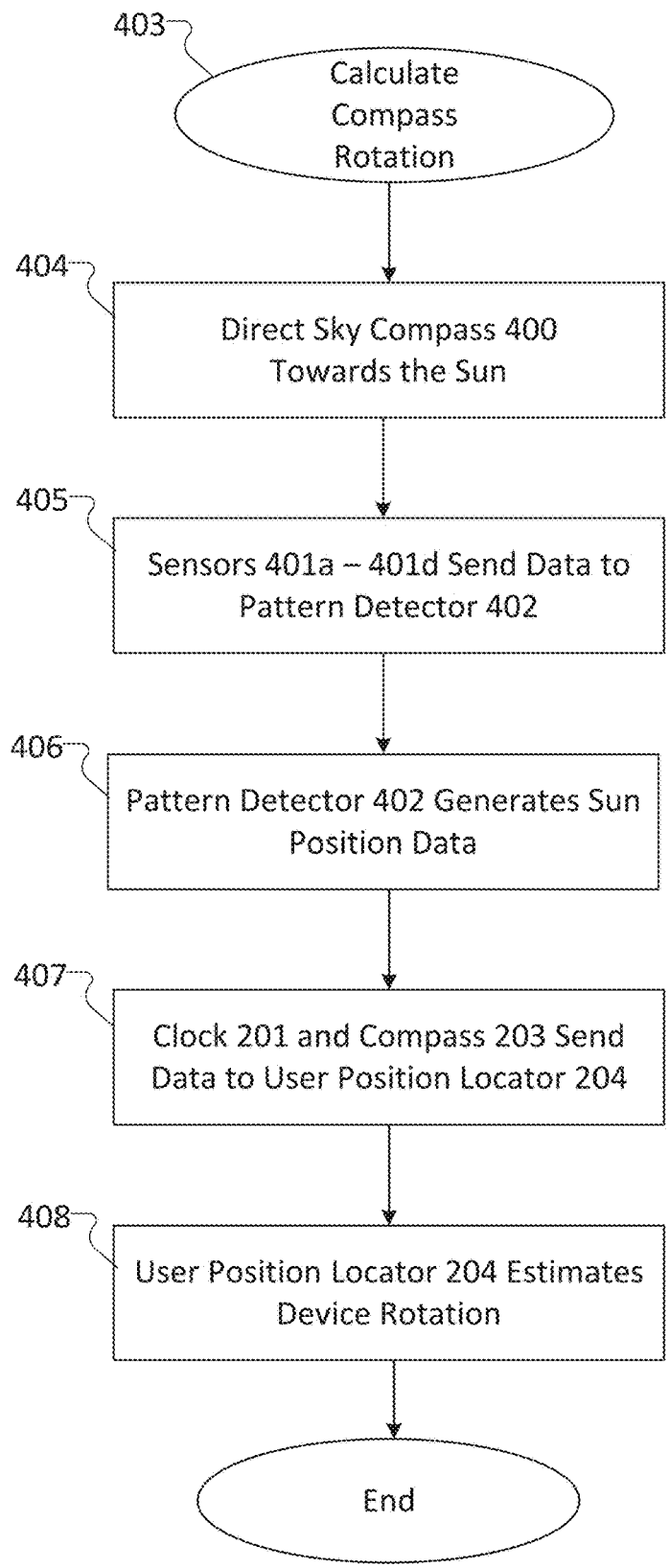
FIG. 4B is a flow chart of an example process for calculating compass rotation using the sky compass of FIG. 4A.

FIG. 4B is a flow chart of a representative procedure 403 for calculating device rotation using sky compass 400 of FIG. 4A. Sky compass 400 is directed towards the sky (Block 404). Sensors 401a-401d send polarization data to pattern detector 402 (Block 405). Pattern detector 402 interpolates between the data provided by each of sensors 401a-401d and correlates the interpolated data with a sky pattern to determine the position (e.g., angle) of the sun (Block 406). The sun position data is provided to user position locator 204, along with compass data from compass 203 and the current time from clock 201 (Block 407). From the sun position, the current time, and the compass rotation, user position locator 204 estimates the device rotation (Block 408).

Figure 5A:
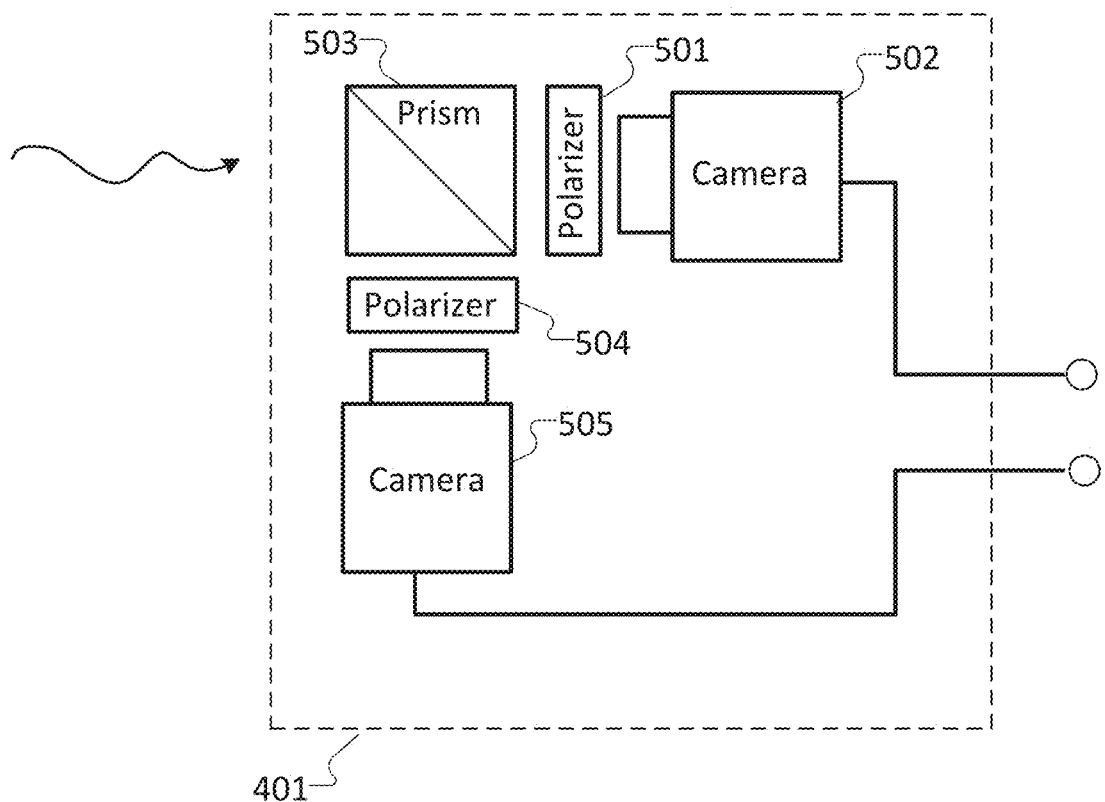
FIGS. 5A, 5B, 5C, and 5D are diagrams of sensors suitable for use in the sky compass of FIG. 4A.

Representative sensors suitable for use in one or more of sensors 401 of FIG. 4A are shown in FIGS. 5A-5D, although other embodiments are possible. The embodiment of FIG. 5A includes a polarizer 501 and camera 502, which can sense at a first angle of polarization, and a polarizer 504 and camera 505, which can sense at a second angle of polarization. The polarization angles of polarizers 501 and 504 may be set, for example, by rotation. A prism 503 splits the incoming light between polarizer 501 and polarizer 504. The embodiment of FIG. 5A provides two outputs to user position locator 204 as two sensors 401 of FIG. 4A.

Figure 5B:
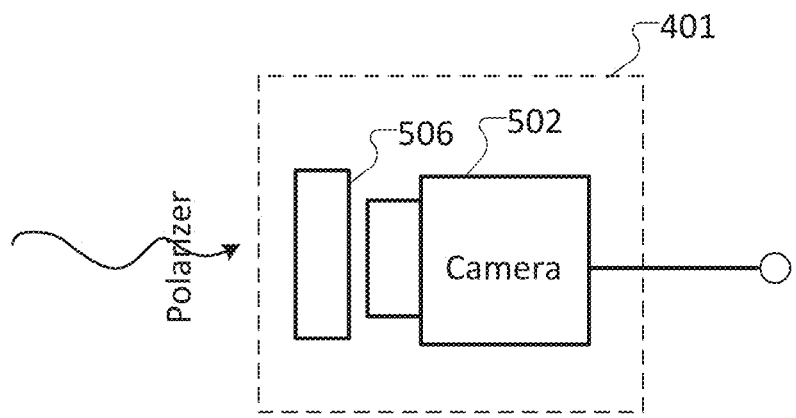

The embodiment of FIG. 5B includes a liquid crystal polarizer 506, a camera 502, and provides a single output. The selected polarization angle of liquid crystal polarizer is set, for example, by rotation.

Figure 5C:
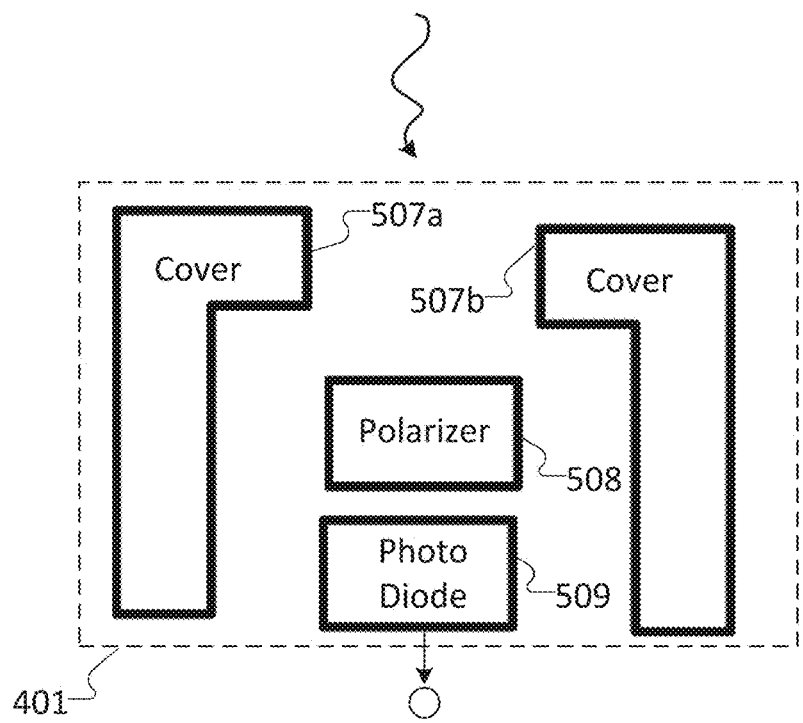
Figure 5D:
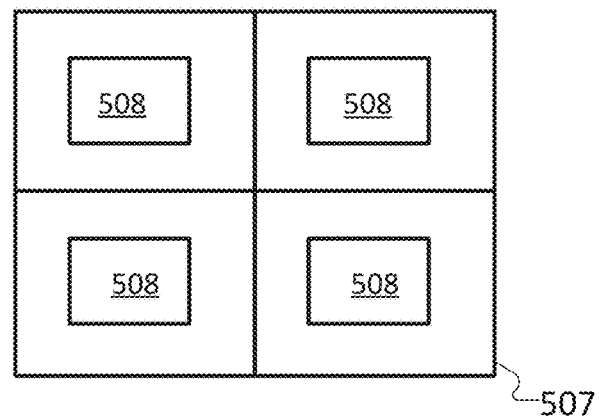

In the embodiment of FIG. 5C (e.g., side view or cross-sectional view), partial covers 507a and 507b direct the light from a region of the sky to a polarizer 508. The angle of polarizer 508 is set, for example, by rotation. The light passed by polarizer 508 is detected by a photodiode 509. An array of four sensors according to the embodiment of FIG. 5C is shown (e.g., top view or bird's eye view) in FIG. 5D. As shown in the example illustrated in FIG. 5D, each of the four sensors is configured with a respective cover 507 (each cover 507 is formed at least in part by partial covers 507a and 507b).

Figure 6A:
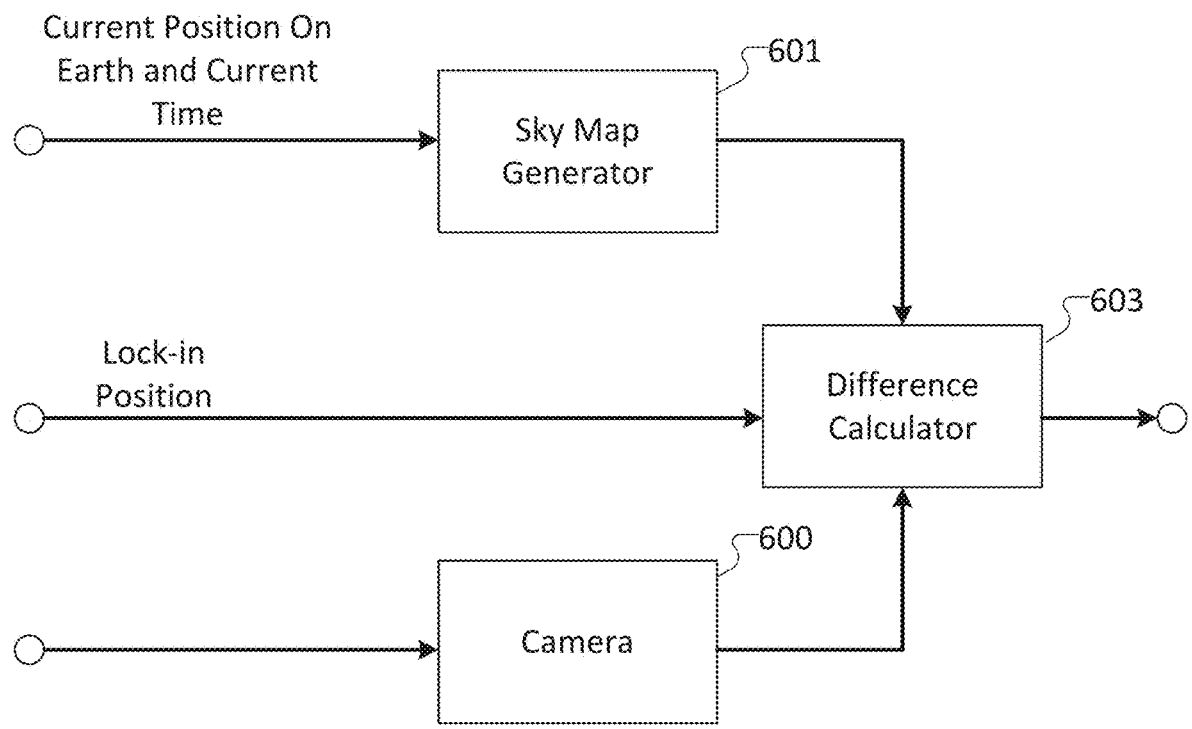
FIG. 6A is a block diagram of an example fast lock-in positional system according to embodiments of the present disclosure.
Figure 6B:
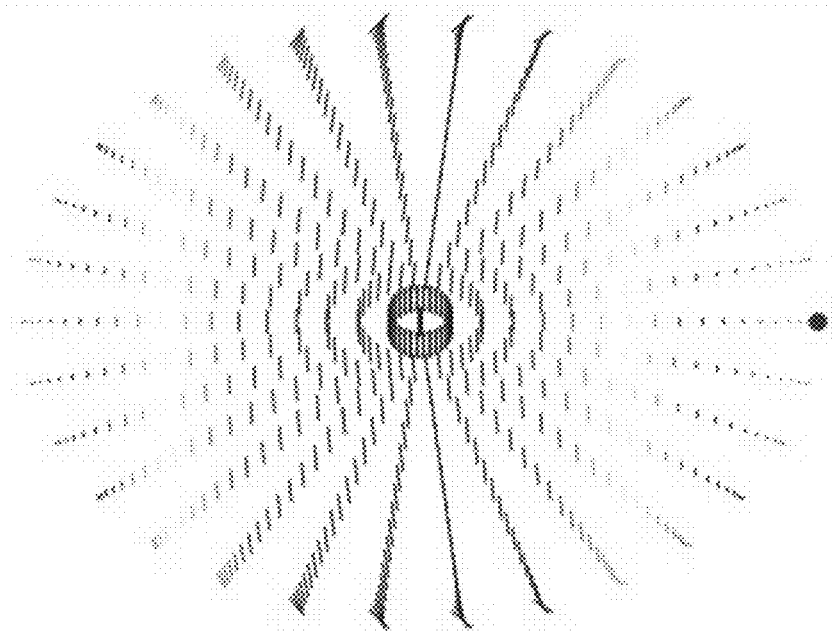
FIGS. 6B, 6C, 6D, and 6E are diagrams of example sky polarization patterns taken at various sun angles and suitable for describing the operation of fast lock-in positional system of FIG. 6A.
Figure 6C:
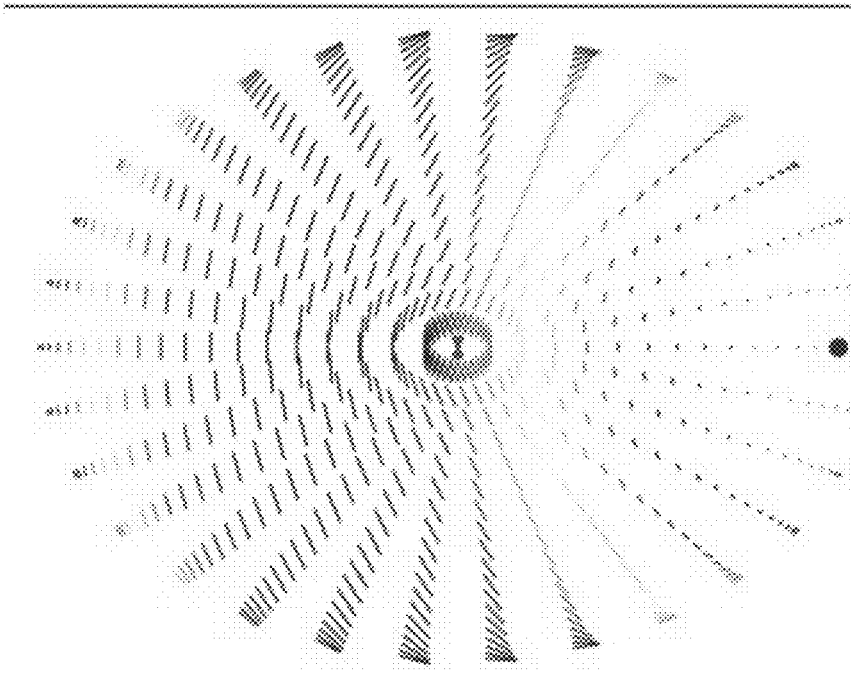
Figure 6D:
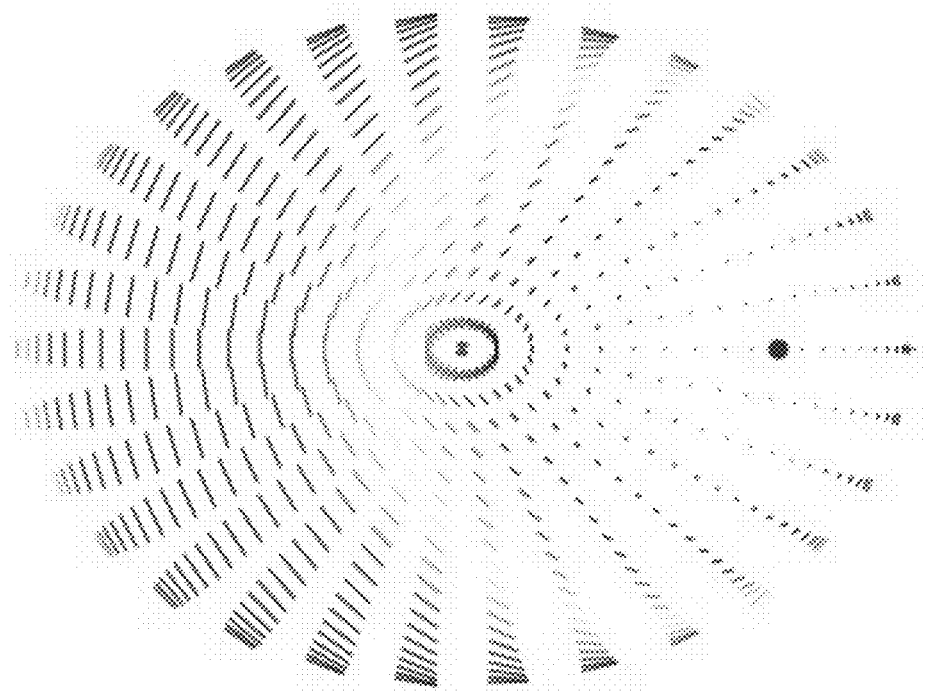
Figure 6E:
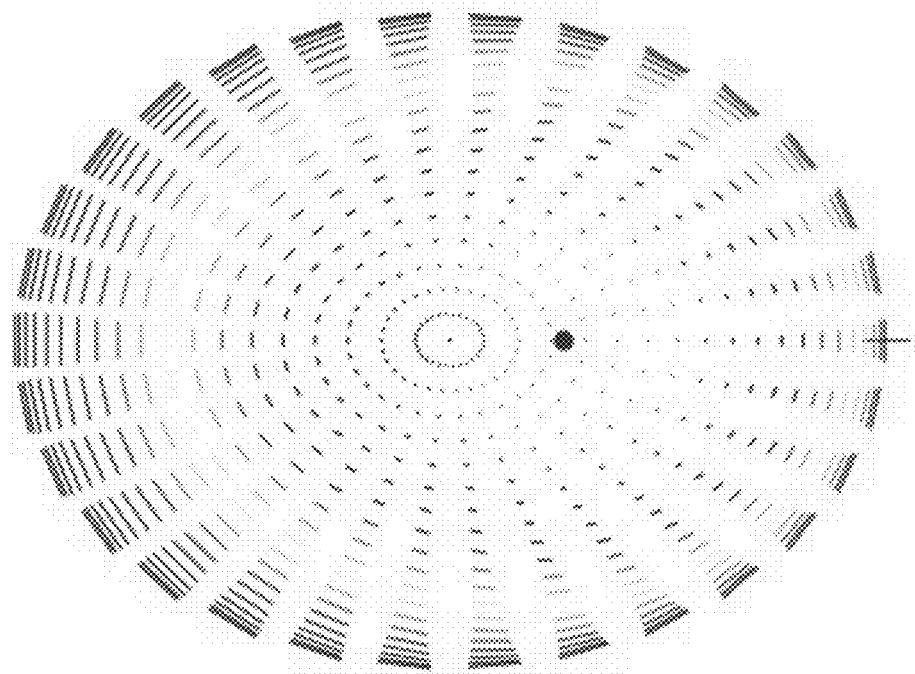

FIG. 6A is a block diagram of an example fast lock-in positional system according to embodiments of the present disclosure. The embodiment depicted FIG. 6A allows a system or device to lock its GPS position by the sky pattern, given that the sky pattern correlates to a current time and device position on the earth. Representative sky patterns are shown in FIGS. 6B-6E for representative sun angles. A device or system may similarly lock its position based on other celestial objects, such as planets, stars, or constellations.

The embodiment of FIG. 6A includes a sky map generator 601, which provides a sky map based on the current time and position on the earth. Sky map generator 601 may, for example, generate the sky map from lookup tables, using equation-based calculations, or from machine learning and training. FIGS. 6B-6E show exemplary sky maps using various angles of the sun as a reference.

The sky map output from sky map generator 601 is sent to a difference calculator 602, which also receives the data on the desired lock-in position and an image from a camera 600. Difference calculator 602 calculates the difference between the sky map and the camera 600 and locks the result with the lock-in position.

Figure 7:
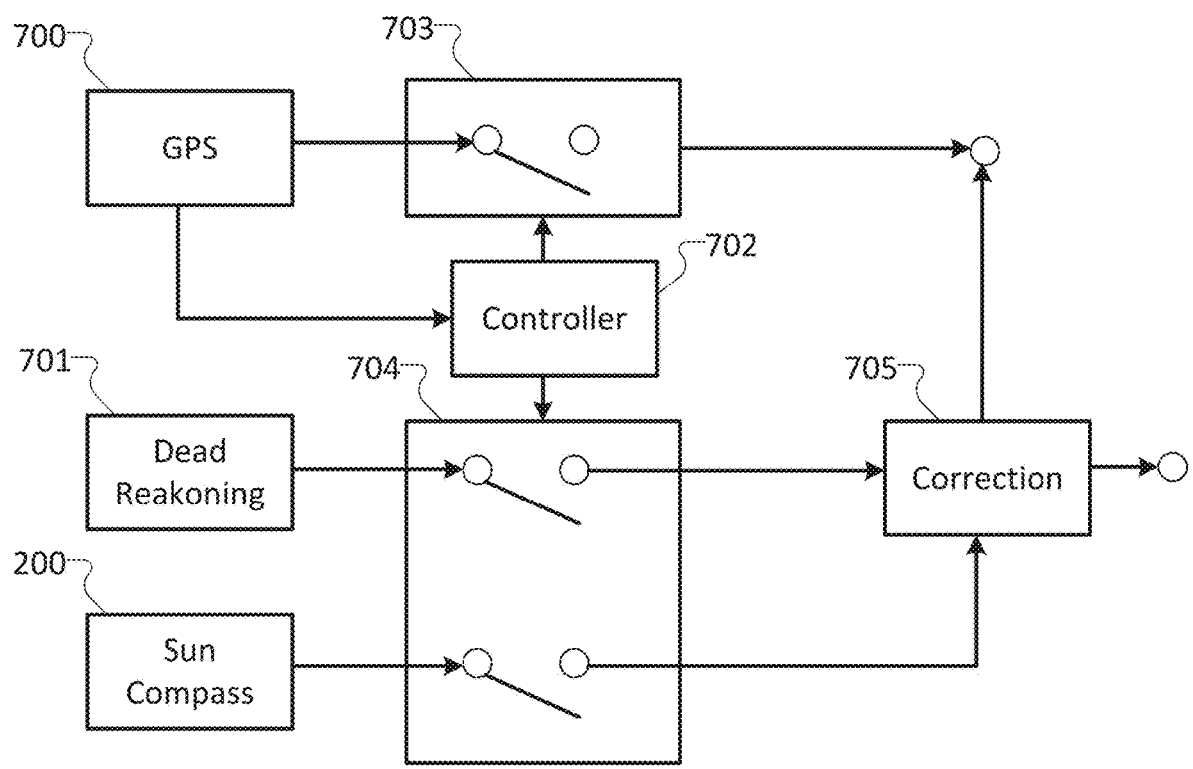
FIG. 7 is a block diagram of a GPS-assisted tracking system according to embodiments of the present disclosure.

FIG. 7 illustrates a sky compass embodiment suitable for GPS tracking and/or a GPS compass. The embodiment of FIG. 7 includes a GPS receiver 700 having an output controlled by a controller 702 and a switch 703. Controller 702 also controls switches 704, which selectively pass dead reckoning inputs 701 and the output from sky compass 200 to a correction unit 705.

In the event that GPS lock is lost, the device or system is shut-off, and/or battery power is low, the system or device can switch from the GPS mode to a dead reckoning mode. In this event, the dead reckoning data 701 is corrected using sky compass 400.

Figure 8:
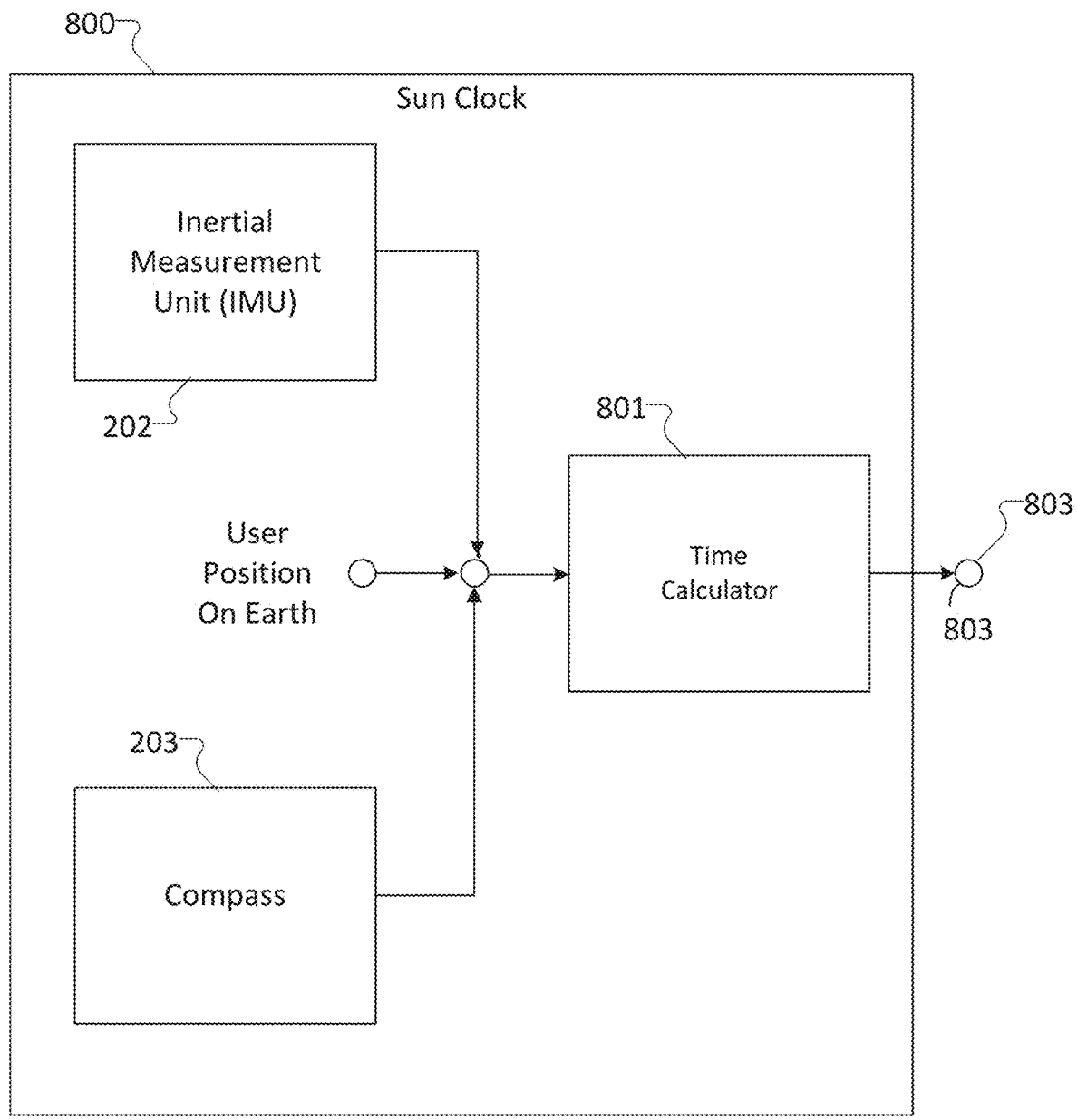
FIG. 8 is a diagram of a sun clock according to embodiments of the present disclosure.

FIG. 8 shows an exemplary sun clock 800 according to embodiments of the present disclosure. In this embodiment, the IMU provides data on the location of the sun and compass 203 provides the compass bearing. If the user position on earth is known, for example through GPS, then the current time at the position can be measured by time calculator 801, with the result provided at output 803.

Figure 9:
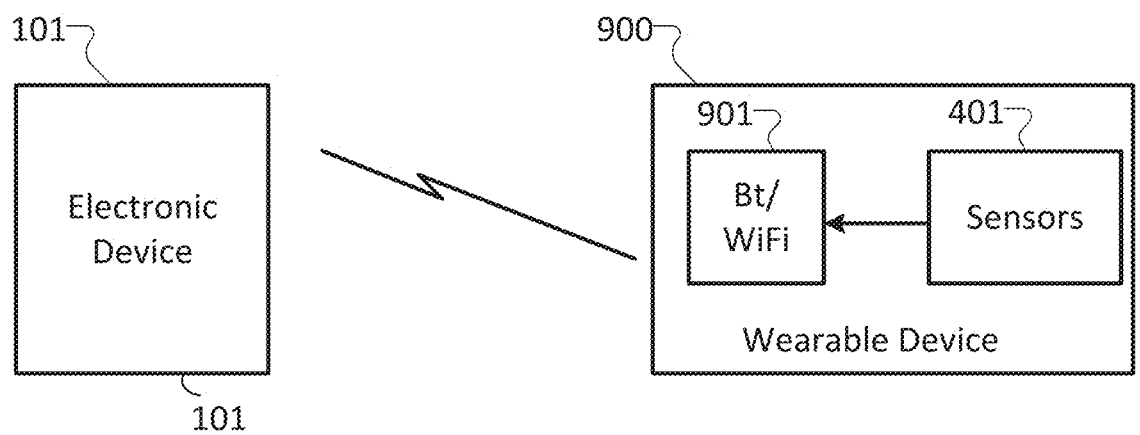
FIG. 9 is a diagram of a system including a wearable device with a sky compass according to embodiments of the present disclosure.

The embodiments of the present disclosure are not dependent on form, and can be applied to various stand-alone devices, as well as integrated systems. For example, as shown in FIG. 9, the sensors 401 of FIG. 4A may be embedded in a wearable device 900, which also includes a Bluetooth or WiFi device 901 for wireless communications with an electronic system or device, such as electronic device 101. In the example shown in FIG. 9, the more computationally intensive units of the system, such as pattern detector 402 and user position locator 204 may be part of electronic device 101. In addition, units such as clock 201, IMU 202, and compass 203, may also form part of electronic device 101, although that is not a requirement.

It should be noted that the illustrated regions of the figures are merely examples. Also, it should be noted that although the above illustrations are shown in two dimensions, the depicted structures are often three dimensional. It also should be noted that for clarity and ease of illustration, the figures are not necessarily made to scale.

While the above detailed diagrams have shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure.

It is therefore contemplated that the claims will cover any such modifications or embodiments that fall within the true scope of the disclosure.

What is claimed is:

1. A method comprising:
   receiving, at an electronic device, skylight sensor data;
   generating environment data from the skylight sensor data, the environment data comprising a value of a geospatially-dependent parameter associated with light received by a skylight sensor from a predetermined celestial light source;
   receiving at least two variables from among a plurality of variables including:
      a compass direction of the predetermined celestial light source when the skylight sensor data was received,
      a time at which the skylight sensor data was received, or
      a geospatial coordinate at which the skylight sensor data was received; and
   determining, based at least in part on the environment data, for at least one of the plurality of variables that was not received when the skylight sensor data was received, at least one of:
      the compass direction of the predetermined celestial light source when the skylight sensor data was received,
      the time at which the skylight sensor data was received, or
      the geospatial coordinate at which the skylight sensor data was received.

2. The method of claim 1, wherein the predetermined celestial light source is at least one of a sun or a star visible at night.

3. The method of claim 1, wherein the skylight sensor comprises at least one of a camera or a photodiode.

4. The method of claim 1, wherein the geospatially-dependent parameter associated with the light received by the skylight sensor from the predetermined celestial light source is at least one of a polarization angle of the light received by the skylight sensor, an elevation of the predetermined celestial light source, or an azimuth of the predetermined celestial light source.

5. The method of claim 1, further comprising:
   receiving, at the electronic device, position sensor data from at least one of an inertial measurement unit (IMU), a compass, a magnetometer, or an accelerometer;

wherein the determining is based at least in part on the environment data and the position sensor data.

6. The method of claim 1, further comprising:
determining that a global positioning system (GPS) lock of a GPS signal associated with a device is terminated, the device comprising the skylight sensor; and
restoring the GPS lock using the environment data.

7. The method of claim 1, wherein the skylight sensor data is received from a second electronic device configured to collect and aggregate time-stamped skylight sensor data and time-stamped compass direction data over a predetermined period of time.

8. A computing system comprising:
a processor operable to:
receive skylight sensor data;
generate environment data from the skylight sensor data, the environment data comprising a value of a geospatially-dependent parameter associated with light received by a skylight sensor from a predetermined celestial light source;
receive at least two of a plurality of variables including: a compass direction of the predetermined celestial light source when the skylight sensor data was received, a time at which the skylight sensor data was received, or a geospatial coordinate at which the skylight sensor data was received; and
determine, based at least in part on the environment data, for at least one variable of the plurality of variables that was not received when the skylight sensor data was received, at least one of: the compass direction of the predetermined celestial light source when the skylight sensor data was received, the time at which the skylight sensor data was received, or the geospatial coordinate at which the skylight sensor data was received.

9. The computing system of claim 8, wherein the predetermined celestial light source is at least one of a sun or a star visible at night.

10. The computing system of claim 8, wherein the skylight sensor comprises at least one of a camera or a photodiode.

11. The computing system of claim 8, wherein the geospatially-dependent parameter associated with the light received by the skylight sensor from the predetermined celestial light source is at least one of a polarization angle of the light received by the skylight sensor, an elevation of the predetermined celestial light source, or an azimuth of the predetermined celestial light source.

12. The computing system of claim 8, wherein the processor is further operable to:
receive position sensor data from at least one of an inertial measurement unit (IMU), a compass, a magnetometer, or an accelerometer; and
determine the at least one variable that was not received when the skylight sensor data was received based at least in part on the environment data and the position sensor data.

13. The computing system of claim 8, wherein the processor is further operable to:
determine that a global positioning system (GPS) lock of a GPS signal associated with the skylight sensor is terminated; and
restore the GPS lock using the environment data.

14. The computing system of claim 8, further comprising an electronic device configured to collect and aggregate time-stamped skylight sensor data and time-stamped compass direction data over a predetermined period of time.

15. A non-transitory computer-readable medium comprising program code that, when executed by a processor, causes the processor to:
receive skylight sensor data;
generate environment data from the skylight sensor data, the environment data comprising a value of a geospatially-dependent parameter associated with light received by a skylight sensor from a predetermined celestial light source;
receive at least two variables of a plurality of variables including: a compass direction of the predetermined celestial light source when the skylight sensor data was received, a time at which the skylight sensor data was received, or a geospatial coordinate at which the skylight sensor data was received; and
determine, based at least in part on the environment data, for at least one variable of the plurality of variables that was not received when the skylight sensor data was received, at least one of: the compass direction of the predetermined celestial light source when the skylight sensor data was received, the time at which the skylight sensor data was received, or the geospatial coordinate at which the skylight sensor data was received.

16. The non-transitory computer-readable medium of claim 15, wherein the predetermined celestial light source is at least one of a sun or a star visible at night.

17. The non-transitory computer-readable medium of claim 15, wherein the geospatially-dependent parameter associated with light received by the skylight sensor from the predetermined celestial light source is at least one of a polarization angle of the light received by the skylight sensor, an elevation of the predetermined celestial light source, or an azimuth of the predetermined celestial light source.

18. The non-transitory computer-readable medium of claim 15, further comprising program code that, when executed by the processor, causes the processor to:
receive position sensor data from at least one of an inertial measurement unit (IMU), a compass, a magnetometer, or an accelerometer; and
determine the at least one variable that was not received when the skylight sensor data was received based at least in part on the environment data and the position sensor data.

19. The non-transitory computer-readable medium of claim 15, further comprising program code that, when executed by the processor, causes the processor to:
determine that a global positioning system (GPS) lock of a GPS signal associated with the skylight sensor is terminated; and
restore the GPS lock using the environment data.

20. The non-transitory computer-readable medium of claim 15, further comprising program code that, when executed by the processor, causes the processor to collect and aggregate time-stamped skylight sensor data and time-stamped compass direction data over a predetermined period of time.

* * * * *